(No Model.)
D. GOFF.
CAR BRAKE AND STARTER.
No. 368,581. Patented Aug. 23, 1887.
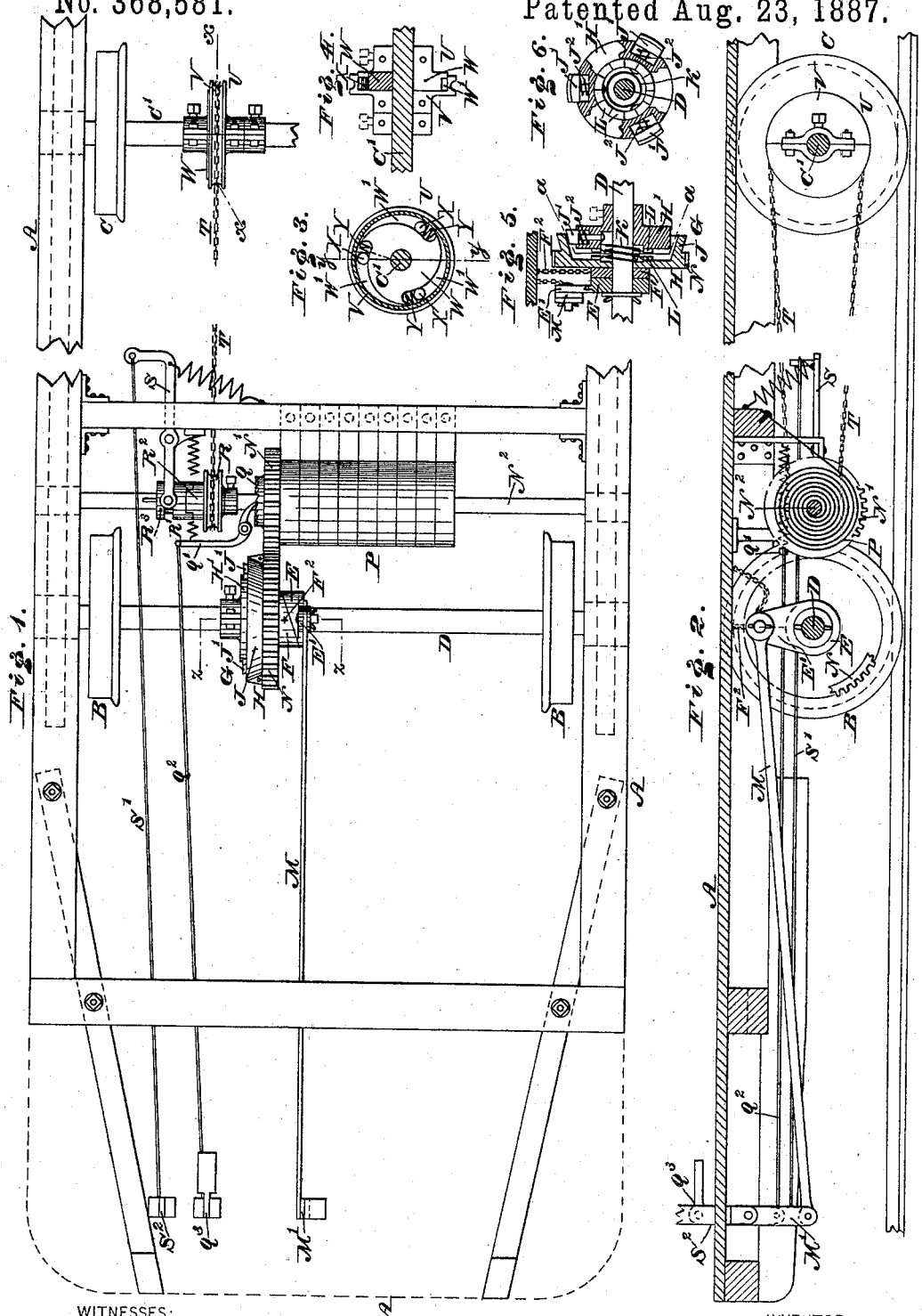
WITNESSES:
A. P. Grant
L. Douville
INVENTOR:
Daniel Goff
BY John A. Wiedersheim
ATTORNEY.

UNITED STATES PATENT OFFICE.

DANIEL GOFF, OF MILLVILLE, NEW JERSEY.

CAR BRAKE AND STARTER.

SPECIFICATION forming part of Letters Patent No. 368,581, dated August 23, 1887.

Application filed November 18, 1886. Serial No. 219,236. (No model.)

*To all whom it may concern:*

Be it known that I, DANIEL GOFF, a citizen of the United States, residing at Millville, in the county of Cumberland, State of New Jersey, have invented a new and useful Improvement in Car Brakes and Starters, which improvement is fully set forth in the following specification and accompanying drawings, in which—

Figure 1 represents a top or plan view of a car brake and starter embodying my invention. Fig. 2 represents a partial side elevation and partial vertical section thereof. Fig. 3 represents a section of a detached part in line $x\ x$, Fig. 1. Fig. 4 represents a section in line $y\ y$, Fig. 3. Fig. 5 represents a section in line $z\ z$, Fig. 1. Fig. 6 represents a section in line $a\ a$, Fig. 5.

Similar letters of reference indicate corresponding parts in the several figures.

My invention consists of a car brake and starter which is easily operated, reliable in execution, and constructed of durable parts, as will be hereinafter fully set forth.

Referring to the drawings, A represents a car-truck, and B C the wheels thereof. On the axle D of the wheel B is fitted or mounted a rotatable cam, E, a non-rotatable cam, F, and a clutch, G, the loose part H of which is in contact with the cam F, and consists of a disk having a conical flange or rim, J, with the inner face of which engage the friction-blocks J' on the fixed part H' of said clutch, said blocks being fitted in radial openings in said part H' and forced against the rim J by the action of springs J$^2$ in said openings. The cam F is prevented from rotation by means of a chain, F$^2$, which is secured to said cam and a proper part of the truck A. Interposed between the parts H H' is a spring, K, which serves to separate said parts when the clutch is to be opened. On the inner sides of the parts H H' are teeth L, arranged in curvilinear direction, forming pinions which are adapted to engage when the clutch is closed, whereby the two parts of the clutch rotate as one. The cams E and F are in contact, the cam E having a crank-arm, E', attached to or formed with it, said arm E' being connected with a rod or bar, M, which latter is secured to a lever, M', conveniently located on the platform of the car, so as to be operated by the driver or conductor thereof, it being seen that when the arm E' is operated the cam E presses against the cam F, thus pushing the part H of the clutch toward the fixed part H' thereof, the friction-blocks J' first engaging with the rim J, after which the teeth L engage and interlock, thus gradually closing or coupling the clutch, avoiding abruptness thereof, so that the part H', which rotates with the axle D, imparts motion to the part H.

On the part H of the clutch is a pinion, N, which meshes with a pinion, N', fixed to the counter-shaft N$^2$, the latter being mounted on the truck A and extending parallel with the axle D.

Secured to the pinion N' and a proper part of the truck is a spring, P, which in the present case consists of several springs arranged side by side and encircling the shaft N$^2$.

Secured to the side of the pinion N' is a ratchet, Q, with which engages a pawl, Q', which is mounted on the truck, and is operated by a rod, Q$^2$, and a lever, Q$^3$, the latter being located on the platform of the car within reach of the driver or conductor thereof.

On the counter-shaft N$^2$ is a loose pulley, R, and clutch R', one part, R$^2$, whereof is secured to said pulley, and the other part, R$^3$, is fitted in the shaft N$^2$, so as to slide laterally thereon and rotate therewith. In the neck of the part R$^3$ of the clutch is freely fitted one end of a lever, S, which is mounted on the truck A and operated by a rod, S', and lever S$^2$, the latter being located on the platform of the car within reach of the driver or conductor thereof.

T represents a chain which passes around the loose pulley R and a clutch, U, on the axle C' of the wheels C, said clutch consisting of a loose pulley, V, which is fitted on said axle C' and encircles the fixed part W of said clutch, said part W being of the form of a collar, with spiral grooves W' in its periphery. In said grooves are friction-blocks X and springs Y, which, as will be seen, are interposed between said part W and the loose pulley V.

When the car is in motion, the part W of the clutch rotates with the axle C', and the blocks X occupy the widest parts of the grooves W', so that the rotary motion of said part W is not communicated to the pulley V.

The operation is as follows: When the car is about to be stopped, the lever M is operated, whereby the cam E moves the cam F against the loose part H of the clutch G, causing the coupling of the clutch and the consequent rotation of the pinion N. The pinion N' thus receives rotation, whereby the spring P is wound, the part R³ of the clutch R' being disconnected from the part R² thereof, whereby the pulley R remains loose on the shaft N². As the spring P is wound it retards the rotation of the axle D, and thus provides a brake for the car. When the car stops, the pawl Q', engaging with the ratchet Q, prevents unwinding of the spring P, the lever M' then being let go, whereby the part H' of the clutch G is released and the pulley N is free to rotate. The lever S² is now operated, whereby the clutch R' is coupled with the pulley R. The lever Q² is also operated, whereby the pawl Q' is withdrawn from the ratchet Q, and the spring P unwinds and rotates the countershaft N², and consequently the pulley R. This operates the chain T, causing the rotation of the loose pulley V of the clutch U, the friction-blocks X being thereby carried into the narrow parts of the grooves W', and wedging between said pulley V and the part W of said clutch U, thus coupling said parts V W. As the part W is fixed to the axle C', it rotates the latter, thus starting the car. The clutch R' is uncoupled and the lever Q³ released, whereby the parts assume a normal position, ready for operation when braking and starting of the car are again required. When the clutch R' is uncoupled, the pulley R is loose, so that the backing of the car does not communicate motion to the shaft N², with which the spring P is connected.

I am aware that it is not new to construct a combined car brake and starter wherein a spring compressed by the rotation of a secondary shaft, the latter being operated by mechanism connected with one of the axles of the truck, is used to stop a car, and the recoil of the said compressed spring operates to start the car by acting on the said mentioned axle, the said device having two separate clutches mounted on the same axle, and having both the gear chain-wheels mounted on both the axle and the secondary shaft; but I am not aware that a combined car brake and starter has ever before been constructed until by me wherein the spring was wound around the secondary shaft by means of a gear-wheel thereon meshing with a wheel on the axle of the truck, the said gear-wheel being adapted by a clutch of peculiar construction to rotate with the axle and thereby wind the spring, the said spring being held in position by mechanism independent of the winding mechanism, thereby permitting the disengagement of the clutch mechanism as soon as the spring is compressed, the secondary shaft having a clutch mechanism whereby a chain-wheel thereon is caused to rotate therewith and operate a second axle of the truck. By the construction described in this specification a car brake and starter is formed which is simple in its details, easy in its operation, and effective in its work.

Having thus described my invention, what I claim as new, and desire to secure by Letters Patent, is—

1. A car brake and starter consisting of a gear-wheel, clutch, and cams mounted on one of the car-axles, means, substantially as described, for operating the same, a secondary shaft with gear-wheels, ratchet and drum mounted thereon, a pawl operated from the platform of the truck and engaging said ratchet, a spring secured to the said drum and the truck, a clutch and a chain-wheel mounted on said secondary shaft and separate means to operate the same, and a second axle having a clutch and chain-wheel thereon, said chain-wheel being connected by chains, all substantially as described.

2. In a car brake and starter, the axle having thereon two cams, one rotatable, the other non-rotatable, side by side, a lever connected to said rotatable cam, a clutch having a loose part with conical rim outwardly toothed, and a fixed part with openings in periphery, having friction-blocks therein with spring-bearings and an interposing spring between said loose and fixed parts, a secondary shaft with a wheel, a drum and ratchet thereon, and a pawl engaging said ratchet and operated from the platform of the truck, all of said parts combined and arranged substantially as and for the purpose set forth.

3. A car brake and starter provided with a spring and a gear-wheel connected therewith and a gear-wheel connected with a clutch, the latter consisting of two parts, one part being formed with a rim and the other part being provided with friction-blocks, the inner sides of the parts having pinions which are adapted to interlock, substantially as described.

4. A car brake and starter having a spring, means for winding the same, and separate means for communicating the power of the same to the axle of the car, consisting of a pulley on the spring-shaft, a chain or cord and a clutch on the axle formed of a grooved collar which is secured to the axle, a loose pulley which encircles said collar, and a friction-block between the collar and pulley, substantially as described.

5. A car brake and starter consisting of a clutch and operating-cams on one of the car-axles, a spring and clutch on a counter-shaft, gearing connected with the first-named clutch and said spring, a clutch on the other car-axle, a chain connecting the latter clutch and the clutch on the counter-shaft, a ratchet on the gear-wheel of the spring, a pawl, and an operating-lever, said parts being combined substantially as described.

DANIEL GOFF.

Witnesses:
JOHN A. WIEDERSHEIM,
A. P. GRANT.